US005761819A

United States Patent [19]

Ledy-Gurren

[11] Patent Number: 5,761,819

[45] Date of Patent: Jun. 9, 1998

[54] COMBINATION CHIP COUNTER AND SWIZZLE STICK

[76] Inventor: Nancy Ledy-Gurren, 51 Cross Hill Rd., Hartsdale, N.Y. 10530

[21] Appl. No.: 752,354

[22] Filed: Nov. 19, 1996

[51] Int. Cl.$^6$ ....... G01B 3/00

[52] U.S. Cl. ....... 33/501; 33/679.1; D7/300.2; 453/60; 366/129

[58] Field of Search ....... 33/501, 679.1, 33/485, 491, 494; 453/58, 59, 60, 63; D7/300.2; 366/129

[56] References Cited

U.S. PATENT DOCUMENTS

| | | | |
|---|---|---|---|
| 253,272 | 2/1882 | Elliot | 453/60 |
| D. 308,278 | 5/1990 | Edwards . | |
| 1,121,815 | 12/1914 | Eaton et al. | 453/58 |
| 1,340,255 | 5/1920 | Schoolfield | 33/485 |
| 1,469,944 | 10/1923 | Merrill | 33/494 |
| 1,501,947 | 7/1924 | Hillman . | |
| 1,586,111 | 5/1926 | Osborn . | |
| 1,602,490 | 10/1926 | Homan | 33/494 |
| 1,607,097 | 11/1926 | Murphy | 33/485 |
| 3,435,833 | 4/1969 | Tanaka | 453/60 |
| 4,436,990 | 3/1984 | Saccucci . | |
| 4,492,243 | 1/1985 | Lombard | 453/59 |
| 5,335,421 | 8/1994 | Jones, Jr. . | |

*Primary Examiner*—William A. Cuchlinski, Jr.
*Assistant Examiner*—Andrew Hirshfeld
*Attorney, Agent, or Firm*—Amster, Rothstein & Ebenstein

[57] ABSTRACT

A combination chip counter and swizzle stick apparatus for enabling a player in a casino environment to quickly measure the monetary value of stacked gambling chips and to mix beverages, comprising an axially elongated member having at least one graduated surface extending along the axial elongation thereof, the elongated member being sized and arranged for mixing beverages, the at least one graduated surface containing indicia identifying a progressive monetary amount proportional to the height of a stack of gambling chips when said apparatus is placed next to the stack to enable the player to read the value from the surface of the elongated member, the apparatus further including color coded surfaces corresponding to the colors of chips of different denominations to enable the player to quickly select the proper graduated surface for the chips to be counted.

11 Claims, 2 Drawing Sheets

COMBINATION CHIP COUNTER AND SWIZZLE STICK

BACKGROUND

The present invention relates to a combination chip counter and swizzle stick apparatus, and more particularly, an apparatus for quickly counting stacks of chips of different denominations in a casino, and for use as a swizzle stick at the casino bar or restaurant.

In a casino environment, it is often necessary for a player to quickly count his or her winnings either prior to cashing out, or in an effort to keep track of winnings and losses during gaming. It is also not unusual for players in the casino to consume beverages at the gambling tables or in the bars and/or restaurants in the vicinity. It would therefore be desirable if an apparatus could be provided that would enable players to quickly ascertain the value of a stack of gambling chips, as well as facilitate mixing of consumable beverages. There is presently nothing in the art which provides this unique combination of functions with a single, easily portable device.

SUMMARY OF THE INVENTION

In accordance with the foregoing, it is an object of the present invention to provide a combination chip counter and swizzle stick apparatus for enabling a player in a casino environment to quickly measure the total monetary value of a stack of gambling chips and to mix beverages.

It is a further object of the present invention to provide a combination chip counting and swizzle stick apparatus which includes a plurality of graduated surfaces corresponding to gambling chips of a specified denomination, for identifying the total value of a stack of chips of the specified denomination by simply placing the apparatus against the stack.

It is yet another object of the present invention to provide a combination chip counter and swizzle stick apparatus having a plurality of graduated surfaces with associated color coding corresponding to the various denominations of the gambling chips typically used in a casino environment.

In accordance with the above objects and additional objects that will become apparent hereinafter, the present invention provides a combination chip counter and swizzle stick apparatus comprised of an axially elongated member having at least one graduated surface extending along the axial elongation thereof. The elongated member is sized and arranged for mixing beverages and includes at least one graduated surface containing indicia identifying a progressive monetary amount proportional to the height of a stack of gambling chips to enable the player to read the value from the surface of the elongated member. In a preferred embodiment, the elongated member includes a plurality of surfaces, wherein each surface contains graduated indicia corresponding to gambling chips of different specified denominations for identifying the total value of a stack of chips of each denomination. A preferred embodiment also includes color coding on each graduated surface which is associated with the colors of the chips that are used in a typical casino. The color coding may be implemented by providing an entire graduated surface in a specified color, or alternatively, by placing segmenting lines of such color between sequential total value denominations corresponding to the height of a stack of chips. The elongated member preferably includes an enlarged grasping portion defined at one end thereof to facilitate manipulation during the chip counting and/or mixing functions.

The present invention will now be described in detail with particular reference to the accompanying drawings.

DETAILED DESCRIPTION OF THE PREFERRED EMBODIMENT

Figure 1:
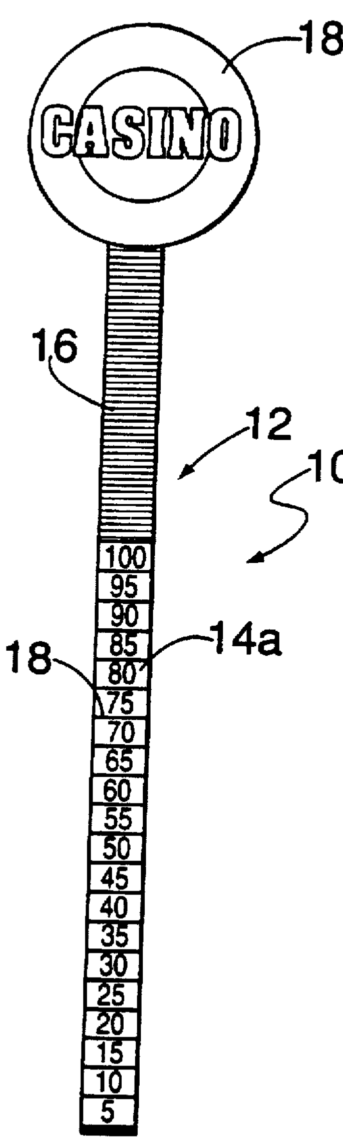
FIG. 1 is an elevational view of a combination chip counter and swizzle stick in accordance with the present invention, from a first side.
Figure 2:
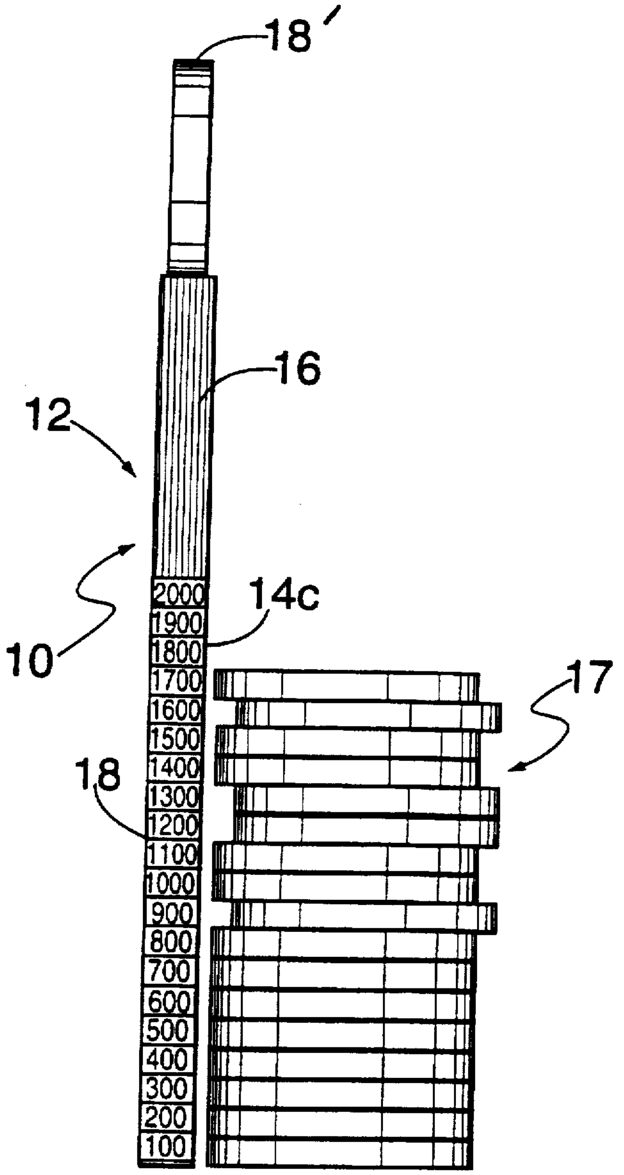
FIG. 2 is an elevational view thereof from a second side.
Figure 3:
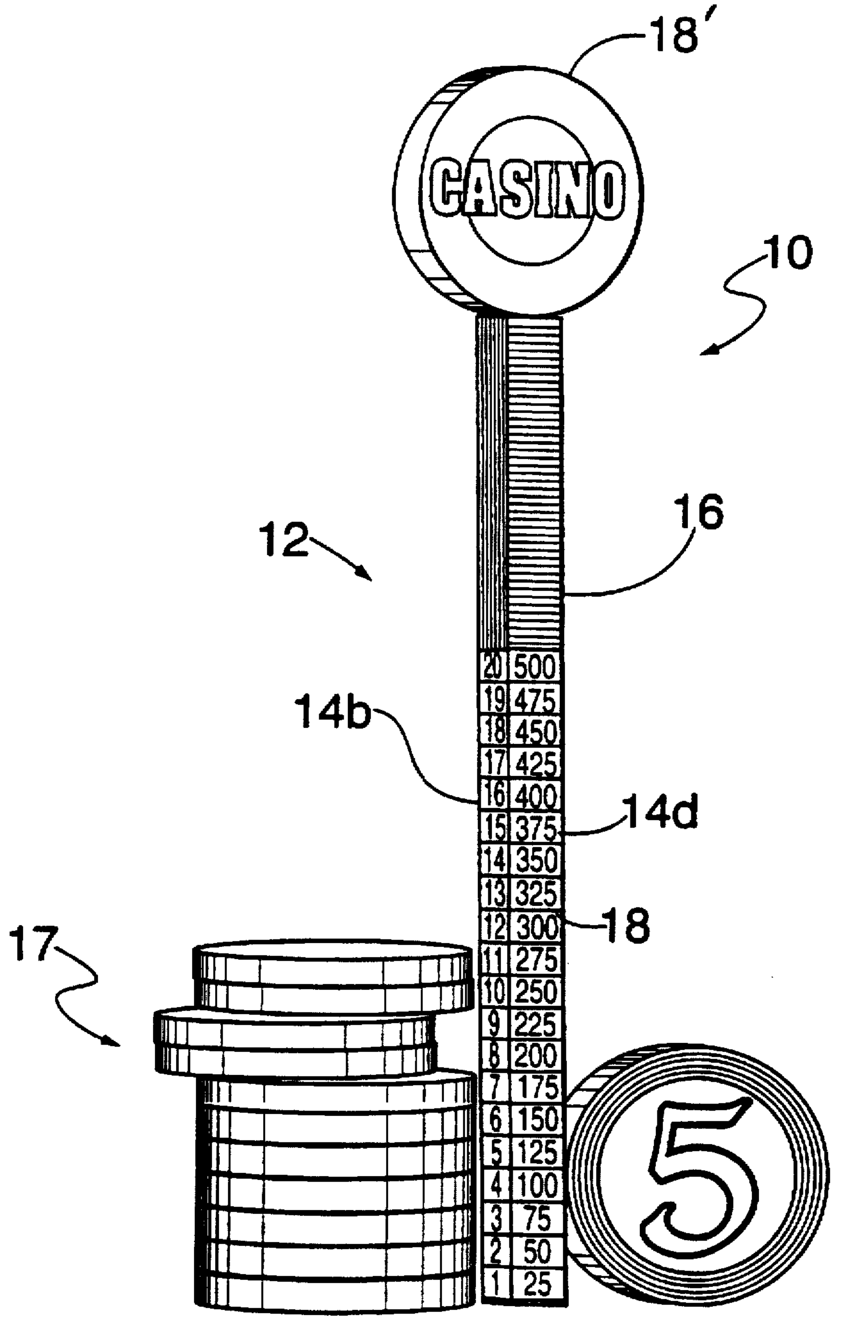
FIG. 3 is an isometric elevational view thereof showing the two remaining sides.

With reference to the several views of the drawings, there is shown a preferred embodiment of a combination chip counter and swizzle stick apparatus 10, principally comprised of an axially elongated member 12 having a plurality of graduated surfaces **14*a*–14*d* extending along the axial elongation thereof. The elongated member 12 is sized and arranged so as to fit into a typical beverage glass served in a bar or restaurant. In the depicted embodiment, the elongated member 12 includes a shank portion 16 having an integral enlarged portion 18** to facilitate grasping by the player.

With particular reference to the graduated surfaces **14*a*–14*d*, it can be seen that a plurality of numerical indicia of sequentially increasing value are disposed along the axial length of each graduated surface to denote the total value of a stack of chips 17 of that denomination when the apparatus 10 is placed next to the stack. As shown in the drawings, it can be seen that there are different graduations, for example: 14*a* corresponds to $5.00 chips; 14*b* corresponds to $1.00 chips; 14*c* corresponding to $100.00 chips; and 14*d* corresponds to $25.00 chips. Since typical gambling chips are of the same size (e.g., 1½×⅛ inches), contiguous graduated lines 18** are calibrated at ⅛ inch increments to identify each total value for a gambling chip stack of a given depth.

Another feature of the invention relates to color coding the graduated surfaces **14*a*–14*d* since gambling chips of a common denomination are typically of the same particular color. Thus, for example, if the graduations of 14*a* correspond to red chips, those of 14*b* to white chips, those of 14*c* to black chips, and those of 14*d* to green chips, such color may be incorporated into the shank portion 16 and/or the graduated lines 18 to enable the player to quickly line up the appropriate side surface of the apparatus 10** for viewing next to the stack of chips whose monetary value is to be determined.

The apparatus may be readily fabricated from a variety of molded plastics, the easiest and preferred method being an injection molded plastic having good durability and resistance to a liquid environment, such as those used in standard swizzle sticks in restaurants and the like. The graduations may be silkscreened or otherwise molded, or painted into the graduated surfaces of the elongated member 12 as required.

The present invention has been shown and described in what are considered to be the most practical and preferred embodiments. It is anticipated, however, that departures may be made therefrom and that obvious modifications will be implemented by persons skilled in the art.

We claim:

1. In combination, a stack of gambling chips and a combination chip counting and swizzle stick apparatus for enabling a player in a casino environment to quickly measure the monetary value of the stack of gambling chips and to mix beverages, comprising in side-by-side relationship:

(A) the stack of gambling chips, wherein the stack of chips is of a given denomination and like color; and (B) the apparatus, wherein the apparatus includes an axially elongated member having an opposed pair of free ends and a plurality of graduated surfaces extending along said axial elongation thereof intermediate said ends, said elongated member being sized and arranged for mixing beverages, each said graduated surface containing indicia identifying a progressive monetary amount proportional to the height of various stacks of gambling chips, one of which is said stack of gambling chips, each said graduated surface containing graduated indicia corresponding to gambling chips of a specified denomination for identifying the total value of the various stacks of chips of said specified denomination, said apparatus being disposed adjacent to said stack to enable the player to read said value from said surface of said elongated member, each of said graduated surfaces having a different like color associated therewith on at least a portion thereof corresponding to each of said specified denominations, the one of said graduated surfaces adjacent said stack of chips and said stack of chips being of a common like color.

2. The combination recited in claim 1, wherein said graduated indicia on each surface of said elongated member comprises a plurality of transverse lines of the respective like color.

3. The combination recited in claim 1, wherein said graduated indicia on each surface of said elongated member comprises a plurality of numbers of the respective like color.

4. In combination, a beverage container and a combination chip counting and swizzle stick apparatus for enabling a player in a casino environment to quickly measure the monetary value of stacked gambling chips and to mix beverages, comprising:

the beverage container, wherein the beverage container is of a predetermined height; and the apparatus, wherein the apparatus includes an axially elongated member having a plurality of graduated surfaces extending along said axial elongation thereof, said elongated member being sized and arranged for mixing in said beverage container beverages, each of said graduated surfaces containing indicia identifying a progressive monetary amount proportional to the height of a stack of gambling chips of a specified denomination having a total value when an appropriate one of said graduated surfaces of said apparatus is placed adjacent to the stack to enable the player to read said total value from said adjacent surface of said elongated member.

5. In combination, a beverage container and a combination chip counting and swizzle stick apparatus for enabling a player in a casino environment to quickly measure the monetary value of stacked gambling chips and to mix beverages, comprising:

the beverage container, wherein the beverage container is of a predetermined height; and the apparatus, wherein the apparatus includes an axially elongated member having an opposed pair of free ends and at least one graduated surface extending along said axial elongation thereof intermediate said ends, said elongated member being sized, constituted and arranged for mixing beverages in said beverage container, said at least one graduated surface containing indicia identifying a progressive monetary amount proportional to the height of a stack of gambling chips when said apparatus is placed next to the stack to enable the player to read said value from said surface of said elongated member.

6. The combination recited in claim 5, wherein said elongated member includes a plurality of said graduated surfaces, each surface containing graduated indicia corresponding to gambling chips of a specified denomination for identifying the total value of a stack of chips of said specified denomination.

7. The combination recited in claim 6, wherein each of said surfaces has a different like color associated therewith on at least a portion thereof corresponding to each of said specified denominations.

8. The combination recited in claim 7, wherein said graduated indicia on each surface of said elongated member comprises a plurality of transverse lines of said like color.

9. The combination recited in claim 7, wherein said graduated indicia on each surface of said elongated member comprises a plurality of said numbers of like color.

10. The combination recited in claim 7, wherein each surface of said elongated member has a different color from each other.

11. The combination recited in claim 5, wherein said elongated member includes a grasping section at one said free end thereof.

* * * * *